J. L. BUTTS.
SAFETY VALVE.
APPLICATION FILED MAR. 27, 1913.
1,150,743.
Patented Aug. 17, 1915.
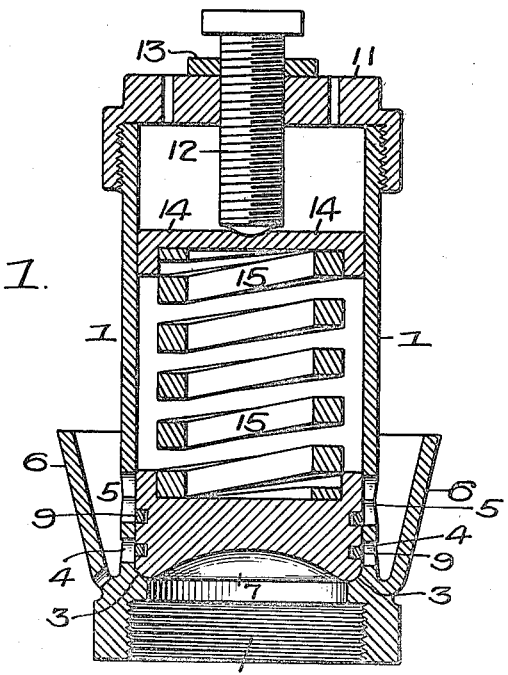
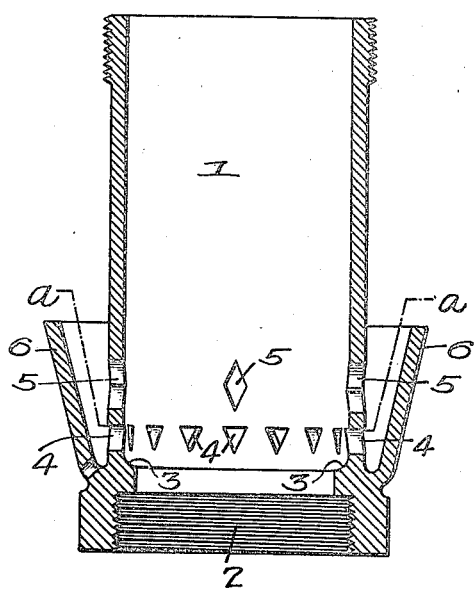
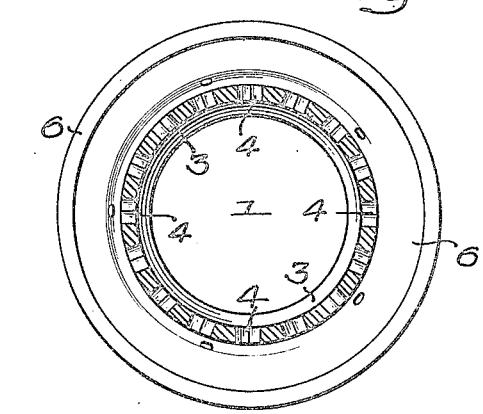
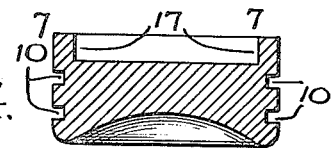
Witnesses.—
Inventor.—
James L. Butts.
by his Attorneys

UNITED STATES PATENT OFFICE.

JAMES L. BUTTS, OF CHESTER, PENNSYLVANIA, ASSIGNOR OF ONE-HALF TO LUKE M. JOHNSON, OF NORWOOD, PENNSYLVANIA.

SAFETY-VALVE.

1,150,743.          Specification of Letters Patent.          Patented Aug. 17, 1915.

Application filed March 27, 1913. Serial No. 757,189.

*To all whom it may concern:*

Be it known that I, JAMES L. BUTTS, a citizen of the United States, and a resident of Chester, county of Delaware, State of Pennsylvania, have invented certain Improvements in Safety-Valves, of which the following is a specification.

The object of my invention is to construct a safety valve so as to prevent the rapid relief of a steam boiler and the quick return of the valve to its seat, thus avoiding the jarring of the boiler and the breaking of stay bolts. This object I attain by making the valve so that it will open and close gradually, yet will allow the steam to blow off promptly.

In the accompanying drawings:—Figure 1 is a vertical sectional view of my improved safety valve; Fig. 2 is a transverse sectional view of the casing, the plunger and the spring being removed; Fig. 3 is a sectional plan view on the line $a$—$a$, Fig. 2; and Fig. 4 is a sectional view of the plunger.

Referring to the drawings, 1 is the casing of the valve having an internal screw thread 2 at its lower end adapted to the screw threaded end of a pipe communicating with the boiler.

3 is a seat, preferably curved, as shown in the drawings.

4 and 5 are two annular series of openings in the valve casing. The lower openings are V-shaped and the upper openings are diamond shaped, as indicated in Fig. 2.

Surrounding the casing, and preferably cast integral therewith, is a deep flange 6 tapered, as shown, so as to deflect the steam as it escapes from the openings 4 and 5, and in the lower portion of the flange are drip openings to carry off any water that may accumulate in the space surrounded by the flange. Mounted in the casing is a plunger valve 7 having a rounded lower end adapted to close against the seat 3. The plunger 7 has a sliding fit in the casing and is preferably provided with rings 9 adapted to grooves 10 to make the joint between the piston and the casing steam tight. Screwed on to the upper end of the casing 1 is a cap 11 and in the cap is an adjusting screw 12, held in the position to which it is adjusted by a jam nut 13, in the present instance. This adjusting screw bears against a flanged spring seat 14 and mounted between this seat and the plunger 7 is a spring 15. The spring rests at the upper end in the recess formed by the flange of the seat and at the lower end in the recess 17 in the plunger 7. By adjusting the screw 12, the spring 15 can be compressed to resist the pressure of the steam under the plunger valve. There are one or more leakage ports in the cap, as shown in Fig. 1, so as to allow for the escape of any entrapped steam.

I preferably make the bottom of the plunger concaved, as shown, so as to entrap a certain amount of steam, which will allow the valve to seat itself more quietly than where the plunger is not provided with a cup.

The action of the valve is as follows: This invention is particularly adapted for use in connection with locomotive boilers, but it can be used any place where it is desired to blow off the boiler or container when a fluid reaches a given pressure. When the steam pressure in the boiler is above that to which the valve is set, it will raise the plunger valve off its seat, but steam will not escape through the valve until the piston opens the triangular passages 4. By making the passages triangular or diamond in shape, the first opening will be very small, consequently, comparatively little steam will leak past the piston at first, but, as the piston is raised by the pressure of the steam, it will increase the area of the passage and the release of the steam will be gradually increased. By this arrangement the noise usually made by valves of the ordinary type is avoided and the shock to the boiler is materially reduced.

If it be desired to blow off the valve to remove foreign material, then the set screw 12 is unscrewed which will allow the cap spring and plunger to move up in the casing and the pressure of the steam will cause the plunger to open the upper series of openings 5, which are larger than the openings 4, and are preferably diamond shaped. After the valve is cleaned of the material, the screw 12 can be readjusted.

By constructing the valve in the above manner, I doubly insure the closing of the valve against steam pressure, as the piston is closed against the seat 3 and also snugly fits the casing and the rings are so located as to prevent any steam from passing around the piston and out the upper line of openings.

By experiments, I find that a valve constructed according to my invention will, when set, for instance, at a given pressure, blow off immediately and will close as soon as the pressure again reaches that to which it was set and will not allow the boiler pressure to pass below the point. This is due to the gradual opening and closing of the ports.

I claim:

1. The combination in a safety valve, of a casing having a seat at its lower end and having two annular series of openings in the casing above the seat, the series of openings farthest from the seat being of greater diameter than the other series; a plunger valve in the casing adapted to close on its seat and also adapted to close both series of openings; a spring tending to hold the valve to its seat; and a screw bearing upon the spring so that when the valve blows off the first series of openings only will be uncovered but when it is desired to blow off the valve to remove foreign material the screw is backed off to allow the plunger valve to uncover the latter series of openings.

2. The combination of a casing having an annular seat at its lower end and having two series of openings above the seat, one series being above the other, the lower series of openings being V-shaped and of less area than the upper series, the upper series being diamond shaped; a plunger valve in the casing adapted to close on its seat and also to close the lower series of openings; a spring tending to force the valve to its seat; and an adjusting screw bearing upon the spring, the valve being so arranged that when the adjusting screw is backed off the valve will be raised above the upper series of openings.

In testimony whereof, I have signed my name to this specification, in the presence of two subscribing witnesses.

JAMES L. BUTTS.

Witnesses:
WM. E. SHUPE,
WM. A. BARR.